United States Patent [19]

Tate

[11] 3,724,671
[45] Apr. 3, 1973

[54] FLUID TREATING FILTER
[75] Inventor: John E. Tate, Louisville, Ky.
[73] Assignee: American Air Filter Company, Inc., Louisville, Ky.
[22] Filed: Feb. 4, 1971
[21] Appl. No.: 112,628

[52] U.S. Cl. ............. 210/484, 55/490, 55/495, 55/518, 55/DIG. 31
[51] Int. Cl. .................................. B01d 27/08
[58] Field of Search........55/493, 490, 501, 503, 495, 55/504, 511, 507, 509, 517, 518, 519, DIG. 31; 210/484

[56] References Cited

UNITED STATES PATENTS

| 3,023,839 | 3/1962 | Best | 55/524 |
| 3,111,489 | 11/1963 | Getzin | 55/517 |
| 3,186,149 | 6/1965 | Ayers | 55/517 |
| 3,252,580 | 5/1966 | Getzin | 55/DIG. 31 |
| 3,280,984 | 10/1966 | Sexton et al. | 55/493 |
| 3,418,794 | 12/1968 | Roberts | 55/501 |

FOREIGN PATENTS OR APPLICATIONS 183,997  7/1936  Switzerland .................. 55/DIG. 31

Primary Examiner—Bernard Nozick
Attorney—Charles G. Lamb and Ralph B. Brick

[57] ABSTRACT

An improved fluid treating filter having two support frames adaptable for mating relationship with a filter media disposed therebetween. Each of the support frames has a retaining screen with side means projecting at right angles therefrom, said side means being provided with snap means which are adaptable for holding the support frames in said mating relationship.

10 Claims, 3 Drawing Figures

PATENTED APR 3 1973 3,724,671
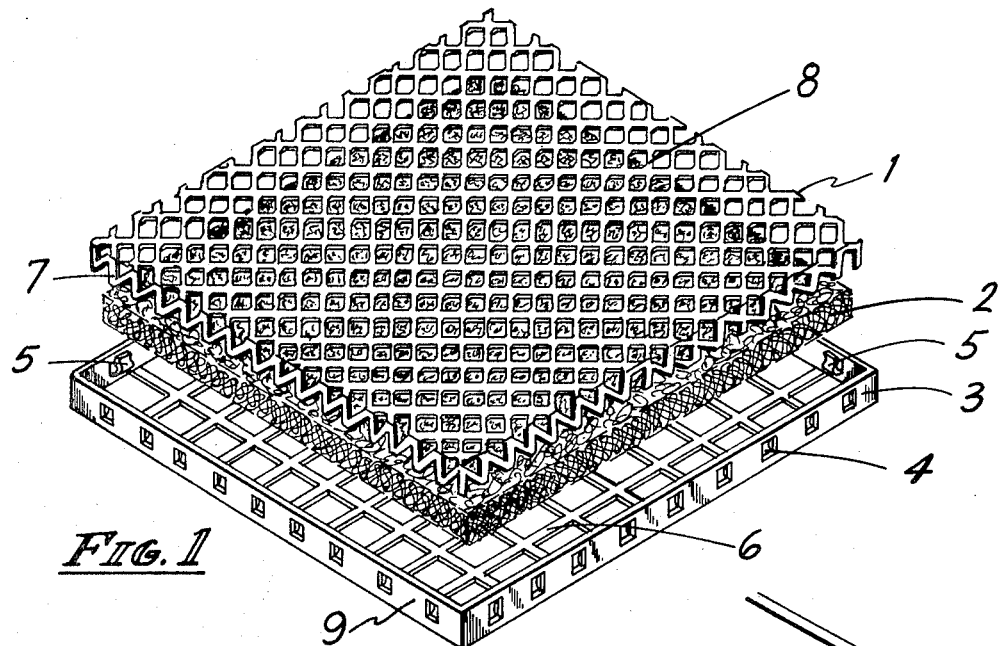
FIG. 1
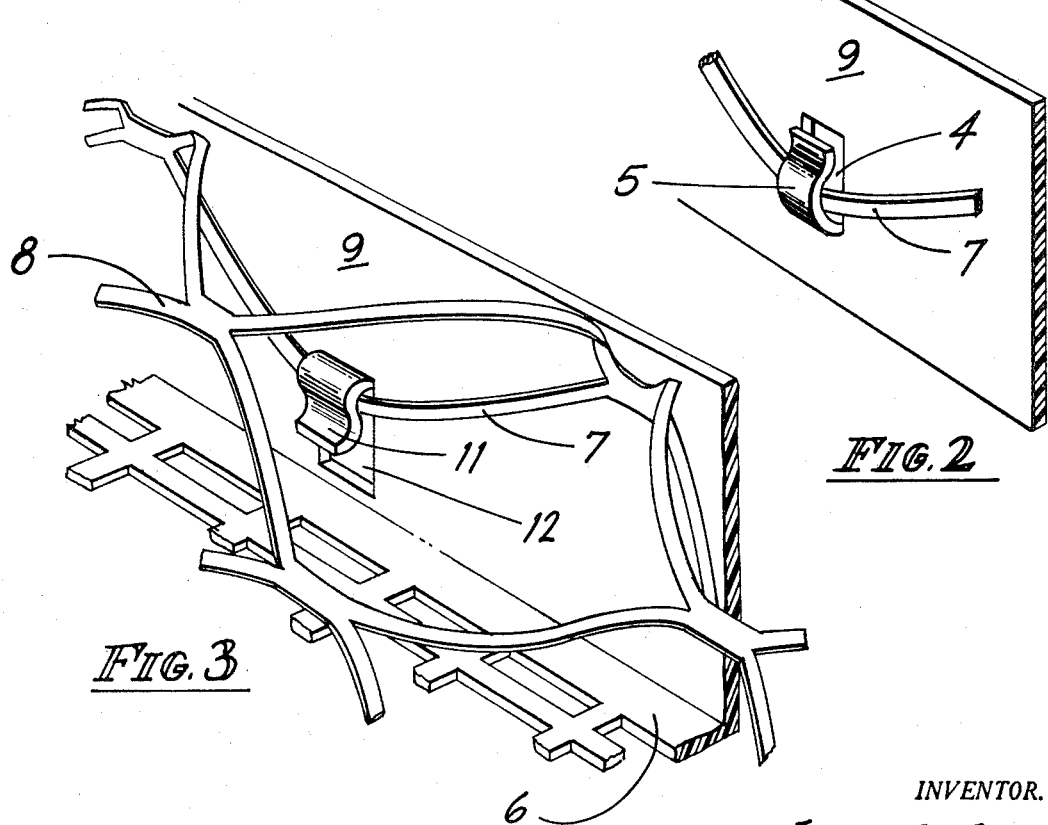
FIG. 2
FIG. 3
INVENTOR.
JOHN E. TATE
BY Charles G. Lamb
ATTORNEY

FLUID TREATING FILTER

BACKGROUND OF THE INVENTION

In the conditioning of air in air conditioners, furnaces, and the like, the air to be processed is usually passed through a filter to remove particles of dust and other foreign matter. For many years filters utilizing fibrous material, such as fiberglas, as a filter media have been used for removing these undesirable particles from the air. These filters come in many sizes and shapes and are constructed by many different methods. One of the most common type of filters in use today is one in which a basic core of loosely packed glass fibers bound together by a resinous coating is confined between two closely perforated sheets of bright brass. The perforated sheets are generally scrap from bottle plants and contain close circular orifices placed as closely together as possible. The circular orifices account for nearly 90 percent of the total sheet area. The fiberglas media and the two closely perforated sheets of bright brass are held together by an inwardly facing U-channel constructed of fiber board. The side pieces of fiber board are either stapled together at their ends to hold them in tact with the perforated sheets or they are attached to the perforated sheets with an adhesive. Further, in some cases a narrowed metal strip is added to extend diagonally across each face of the perforated sheet to give extra strength.

SUMMARY OF THE INVENTION

In the present invention it is recognized that it is desirable to provide a fluid treating filter which is economical, but yet has good strength and rigidity in an operating position. Furthermore, it is recognized that it is desirable to provide a fluid treating filter which may be easily constructed.

The present invention advantageously provides a straight forward arrangement for the preparation of a filter which may be utilized in furnaces, air conditioners, and the like. The present invention further provides a method for preparing fluid treating filters having a two piece filter frame with filter media disposed therebetween.

Various other features of the present invention will become obvious to those skilled in the art upon reading the disclosure set forth hereinafter.

More particularly, the present invention provides a fluid treating filter comprising a first filter frame member having a retaining screen with side means projecting at right angles therefrom and extending substantially around the outer periphery of said retaining screen; a second filter frame member having a retaining screen with side means projecting at right angles therefrom and extending substantially around the outer periphery of said retaining screen, said side means of said second filter frame member having snap lugs adapted for engaging with said side means of said first filter frame member whereby said retaining screen of said second frame member is in face to face relationship and spaced from said retaining screen of said first frame member; and filter media disposed within an opening defined by said first and said second filter frame members.

It is to be understood that the description of the examples of the present invention given hereinafter are not by way of limitation and various modifications within the scope of the present invention will occur to those skilled in the art upon reading the disclosure set forth hereinafter.

Referring to the drawings:

FIG. 1 is an explosive perspective view of a filter of the instant invention;

FIG. 2 is a partial perspective view of a preferred arrangement of connecting the support frame members; and FIG. 3 is a partial perspective view of another preferred arrangement of connecting the support frame members.

Referring to FIG. 1 of the drawings, FIG. 1 illustrates the structure of a filter of the present invention. The filter includes a first support frame member, front frame support 1, filter media 2, and a second support frame member, back frame support 3. The front frame support 1, which is illustrated as expanded metal, includes a retaining screen 8 and side means 7 extending at right angles from screen 8. The back frame support 3, which is illustrated as a formed plastic, includes a retaining screen 6 and side means 9 extending at right angles from screen 6. The extending side means 9 are adaptable to outer fit the extending side means 7 of the front frame support 1. Snap lugs 5, which are illustrated as inwardly and upwardly extending tongues, are provided to engage the extending side means 7 in order to hold the front frame support 1 in a mating relationship with back frame support 3. Filter media 2 is adapted to fit within an opening defined by the engagement of the front and back support frame members. Apertures 4 are illustrated to show that the tongue shaped snap lugs 5 are punched or stamped from the support frame sides 9.

FIG. 2 is a detailed view of a preferred method of engaging the front frame support 1 with the back frame support 3. Tongue shaped inwardly and upwardly extending snap lug 5 is provided to engage one strand of metal of a front support frame side 7. As can be seen from FIG. 3 the strand of metal is slipped between the tongue shaped snap lug 5 and its corresponding aperture 4 wherein the upwardly extending portion of snap lug 5 holds the strand of metal intact. The preferred engagement of snap lug 5 with the strand of metal is at the apex of the strand as this makes for a tighter fit.

FIG. 3 illustrates a detailed view of another preferred method of engaging the front frame support 1 with the back frame support 3. In this example, back support frame side 9 is provided with a tongue shaped inwardly and downwardly extending snap lug 11 having a corresponding aperture 12. The figure illustrates that a strand of the metal of a front support frame side 7 is engaged between the snap lug 11 and the aperture 12. A plurality of snap lugs 11 and appropriate apertures 12 are spaced along the support frame sides 9 of the back frame support 3. Apertures 12 correspond to the apertures 4 as illustrated in FIGS. 1 and 2.

In preparing a filter of the instant invention, a front frame support 1 of expanded metal is fabricated in one section having side means 7 projecting at right angles therefrom which are adaptable for engaging with a back frame support which is fabricated from a material, such as plastic. The back frame support is fabricated into one section having a retaining screen 6 of sufficient porosity to allow the passage of fluid with a minimum amount of interference and side means 9 projecting at right angles therefrom. Stamping means (not shown) are utilized for stamping apertures in the side means 9 at selected positions to provide snap lugs 5 or 11. It is also understood that the snap lugs may be stamped to project outwardly instead of inwardly where it is desirable for the side means having the snap lugs to be interfitting and not outerfitting.

In assembling the filter of the instant invention the steps include adding filter media 2 to the back support frame 3 and pressing the front support frame 1 into position whereby snap lugs 5 or 11 are engaged with strands of expanded metal of side means 7.

It will be realized that various changes may be made to the specific embodiments shown and described without departing from the principles and spirit of the present invention.

What is claimed is:

1. A fluid treating filter comprising: a first filter frame member of expanded metal including a retaining screen with side wall means projecting at right angles therefrom and extending substantially around the outer periphery of said retaining screen; a second filter frame member having a retaining screen with side wall means projecting at right angles therefrom and extending substantially around the outer periphery of said retaining screen, said side wall means of said second filter frame member having snap lugs engaging with said side wall means of said first filter frame member whereby said retaining screen of said second frame member is in face to face relationship and spaced from said retaining screen of said first frame member; and filter media disposed between said first and second filter frame members.

2. The filter of claim 1, said retaining screens of said first and said second filter frame members being of rectangular shape and of approximately the same size, and said side means of said first and said second filter frame member including four side members for each side means.

3. The filter of claim 1, said snap lugs being punched from said side means of said second filter frame.

4. The filter of claim 1, said snap lugs being inwardly and upwardly extending tongues.

5. The filter of claim 1, said snap lugs being inwardly and downwardly extending tongues.

6. The filter of claim 1 wherein said filter media is a fibrous material.

7. The filter of claim 6 wherein said fibrous material is fiberglas.

8. The filter of claim 1, said second filter frame member being plastic, and said side wall means of said plastic outerfitting said side wall means of said first filter frame member.

9. The filter of claim 8, said snap lugs of said side means of said second filter frame being adapted to engage with strands of first filter frame member.

10. The filter of claim 9, said snap lugs engaging said strands of expanded metal at the apex of said strands.

* * * * *